Sept. 13, 1966 J. F. LAYCAK ETAL 3,272,970

AUTOMATIC PRESET COUNTERS

Filed Aug. 21, 1962 4 Sheets-Sheet 1

INVENTORS
JOHN F. LAYCAK AND
WALTER A. WILSON
BY [signature]
ATTORNEY

AUTOMATIC PRESET COUNTERS

Filed Aug. 21, 1962 4 Sheets-Sheet 2

INVENTORS
JOHN F. LAYCAK AND
WALTER A. WILSON
BY T. N. Spencer
ATTORNEY

"OR" CODE

| N | 94 | 92 | 90 | 88 |
|---|---|---|---|---|
| 1 | 1 | 1 | 1 | 0 |
| 2 | 1 | 1 | 0 | 1 |
| 3 | 1 | 1 | 0 | 0 |
| 4 | 1 | 0 | 1 | 1 |
| 5 | 1 | 0 | 1 | 0 |
| 6 | 0 | 1 | 1 | 1 |
| 7 | 0 | 1 | 1 | 0 |
| 8 | 0 | 1 | 0 | 1 |
| 9 | 0 | 1 | 0 | 0 |
| 0 | 1 | 1 | 1 | 1 |

"AND" CODE

| N | $A_1$ | $A_2$ | $A_3$ | $A_4$ |
|---|---|---|---|---|
| 1 | 1 | 0 | 0 | 0 |
| 2 | 0 | 1 | 0 | 0 |
| 3 | 1 | 1 | 0 | 0 |
| 4 | 0 | 1 | 1 | 0 |
| 5 | 1 | 1 | 1 | 0 |
| 6 | 0 | 0 | 1 | 1 |
| 7 | 1 | 0 | 1 | 1 |
| 8 | 0 | 1 | 1 | 1 |
| 9 | 1 | 1 | 1 | 1 |
| 0 | 0 | 0 | 0 | 0 |

INVENTORS
JOHN F. LAYCAK AND
WALTER A. WILSON
BY [signature]
ATTORNEY

Sept. 13, 1966 J. F. LAYCAK ET AL 3,272,970

AUTOMATIC PRESET COUNTERS

Filed Aug. 21, 1962 4 Sheets-Sheet 4

INVENTORS
JOHN F. LAYCAK AND
WALTER A. WILSON
BY [signature]
ATTORNEY

United States Patent Office 3,272,970
Patented Sept. 13, 1966

3,272,970
AUTOMATIC PRESET COUNTERS

John F. Laycak, Duquesne, and Walter A. Wilson, Pittsburgh, Pa., assignors to Jones & Laughlin Steel Corporation, Pittsburgh, Pa., a corporation of Pennsylvania
Filed Aug. 21, 1962, Ser. No. 218,418
16 Claims. (Cl. 235—92)

This invention relates to counting apparatus, and more particularly to counting apparatus which can be automatically preset to count a predetermined number of input pulses.

As is known, the usual counter comprises a plurality of bistable elements each of which can be in an ON or OFF stable state. That is, each element has two stable states of conduction, one of which may be termed "ON" and the other termed "OFF." As each input pulse to be counted is fed to the counter, one or more of the bistable elements changes states; and the bistable element which is ON, or the combination of elements which are ON, changes as each successive input pulse is fed to the counter. Thus, by determining the states of the various bistable elements, the number of input pulses can be determined.

In order to preset a counter such that it will produce an indicating output pulse in response to a predetermined number of input pulses, an output may be taken from a single bistable element in a counter of the type in which one element is ON while all others are OFF when the predetermined count is achieved. If a plurality of bistable elements in the counter are ON when the predetermined count is reached, outputs from the ON elements at that count can be passed through a coincidence stage which will produce an indicating output pulse at that, and only that, count. For example, if it is desired to determine how many thousand input pulses are counted by a counter, the counter can be preset to count one thousand in the manner described above. By applying the output pulses from this counter to a second or tally counter, the count of that tally counter will be the number of input pulses in thousands.

Prior to this invention, it had been common to preset counters by switch closures as, for example, by connecting selected ones of the bistable elements, all of which are ON when a predetermined count is reached, to a coincidence stage. In certain cases, however, it is necessary or desirable to provide a counter which is automatically preset by a second, presetting counter. For example, in U.S. Patent No. 3,157,952 resulting from application Serial No. 217,736, and assigned to the assignee of the present application, there is disclosed a length measuring system for an article passing over conveyor rolls in which an initial length increment must be determined with the use of a first presetting counter, and this length increment used to preset a second counter which will produce an output pulse for each increment of that length of the article which passes a fixed point adjacent the conveyor. The arrangement is such that different sizes and shapes of conveyor rolls must be used for different articles to be measured, meaning that a simple tachometer measuring system is inadequate. Accordingly, the initial incremental length is determined by feeding input pulses from a tachometer on the conveyor to the presetting counter during the time that the article passes between two fixed points on the conveyor, these points being separated by a known distance. When the leading edge of the article reaches the second fixed point, the feed of input pulses to the presetting counter is stopped, thereby presetting the second or preset counter to count a number of pulses representative of the length between the sensing devices. At the same time that the feed of input pulses to the first or presetting counter is stopped, the second counter is enabled to count pulses from the tachometer generator such that it will produce an output pulse each time the count to which it has been preset is reached, the output of the second counter being an indication of the total length of the article.

As an overall object, the present invention provides a means for automatically presetting counting apparatus.

More particularly, an object of the invention is to provide an arrangement wherein first counting apparatus is used to automatically preset second counting apparatus.

In accordance with the invention, hereinafter described in detail, there is provided a first counter, means for feeding input pulses to the first counter, a second counter, means for selectively stopping the feed of input pulses to the first counter and for starting the feed of input pulses to the second counter, and means electrically connected to said first and second counters for presetting the second counter to count the number of pulses counted by the first counter prior to stoppage of the feed of input pulses thereto. The counters may be any of the well-known types such as binary, beam switching or glow transfer arrangements. As will be seen, the first or presetting counter is connected to the second or preset counter by logic circuitry including coincidence stages such that an output pulse will be derived from one of the coincidence stages whenever the preset count is reached by the second counter.

The above and other objects and features of the invention will become apparent from the following detailed description taken in connection with the accompanying drawings which form a part of this specification, and in which.

Figure 2:
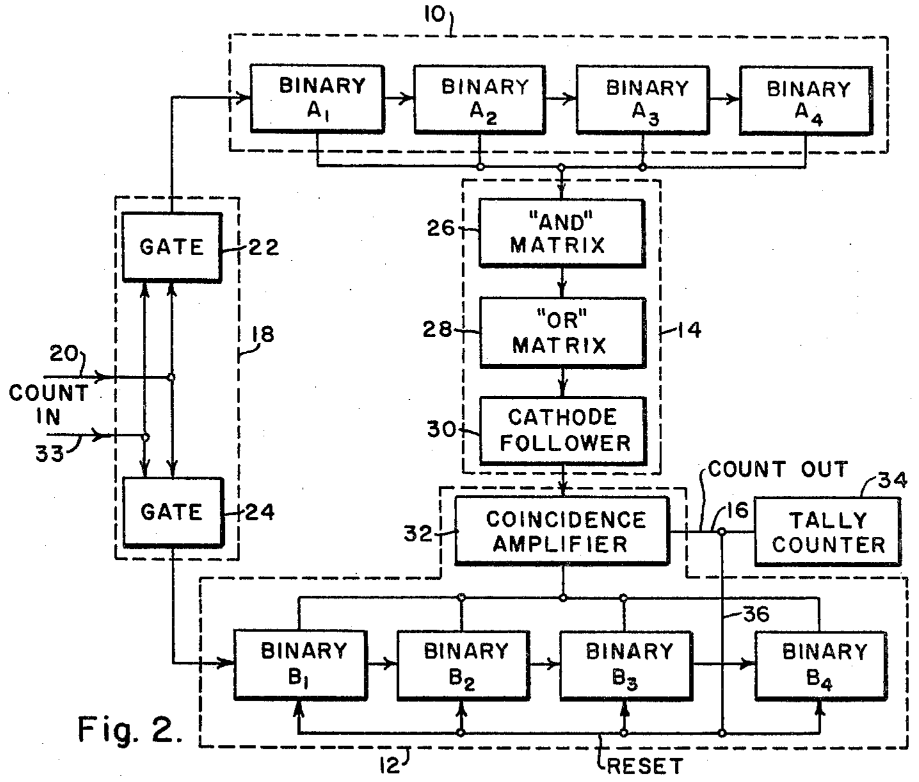
FIG. 2 is a block diagram of a presetting arrangement for binary counters.
Figure 3A:
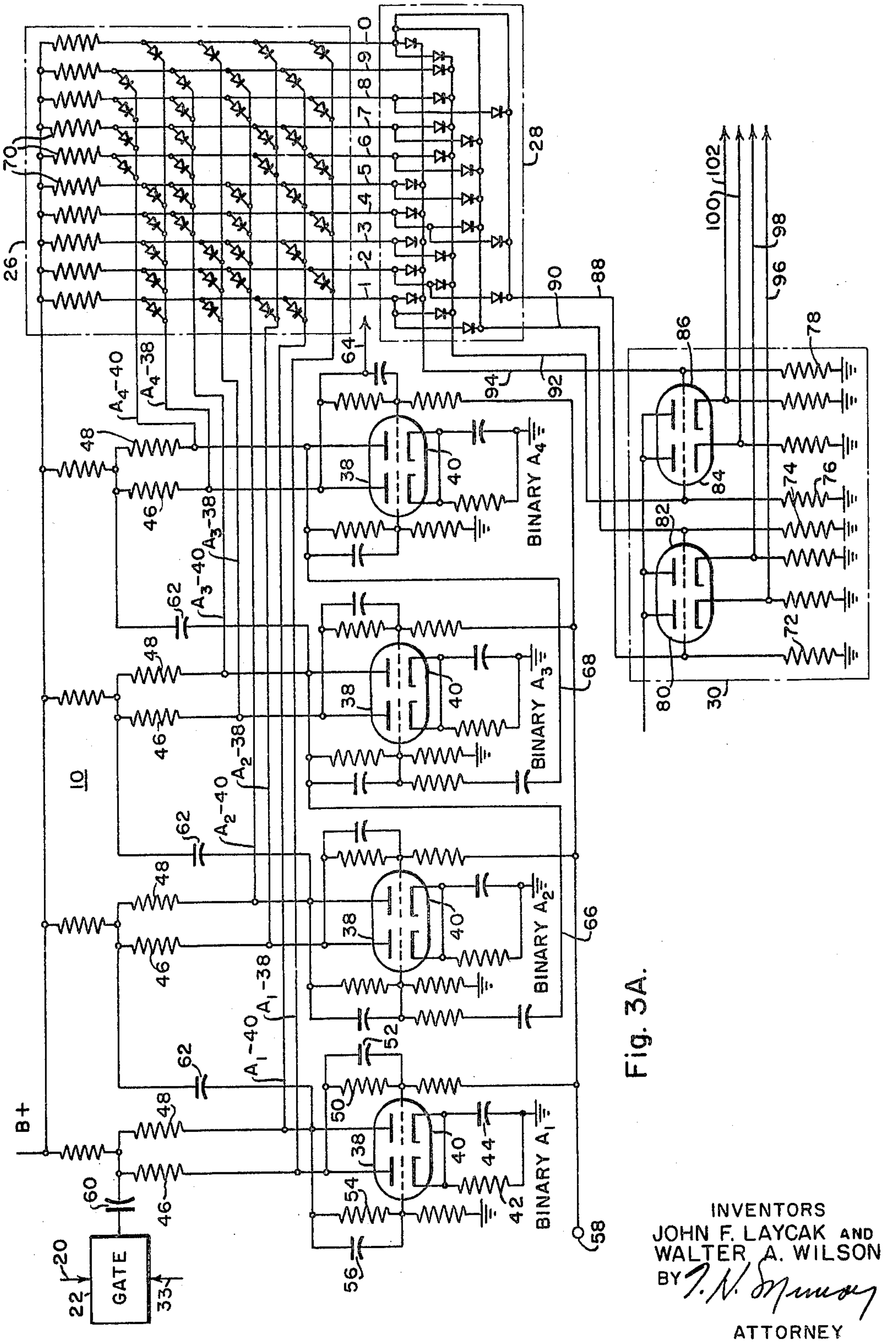
Figures 3B, 4:
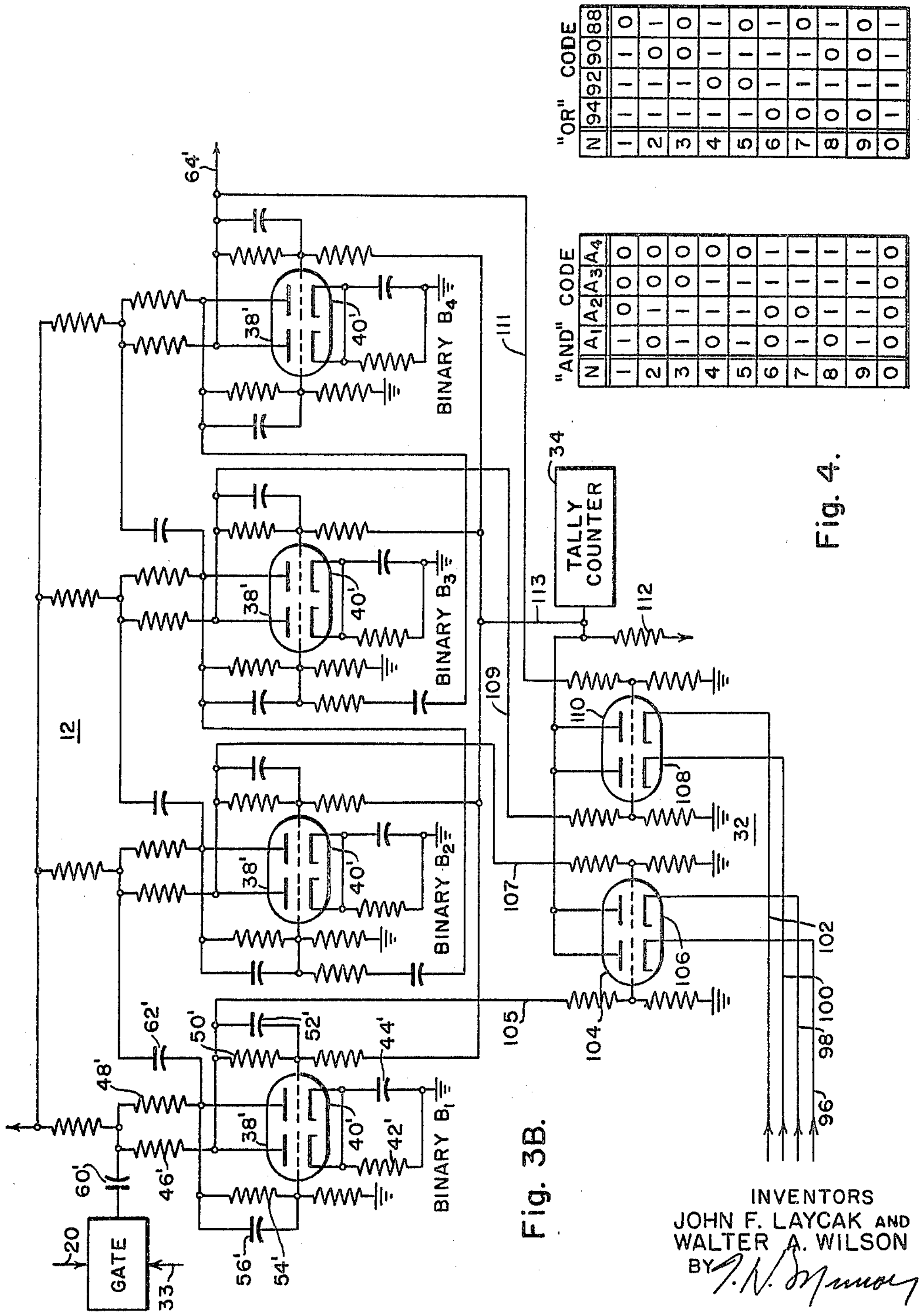
Figure 6:
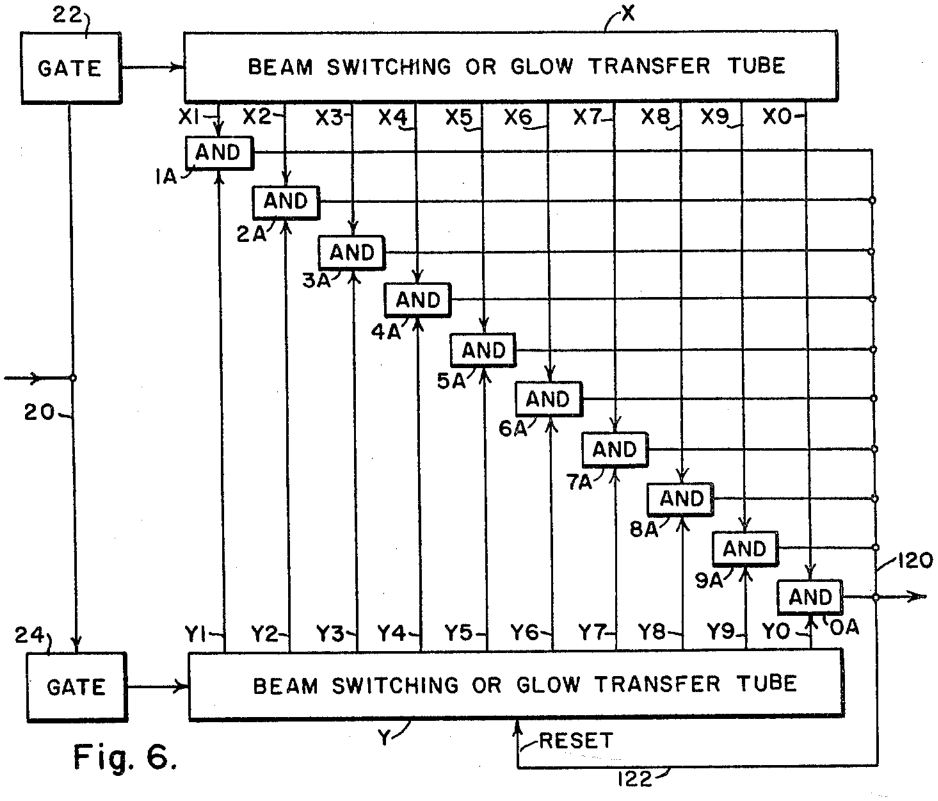
Figure 5:
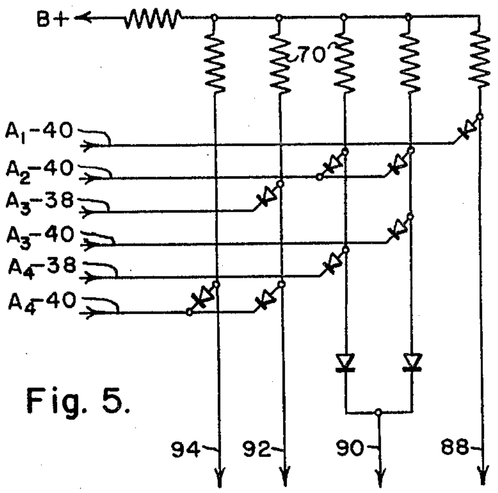

FIGS. 3A and 3B, when placed end-to-end, comprise a schematic circuit diagram of the binary preset counter apparatus shown in block form in FIG. 2;

FIG. 4 illustrates the codes used in the AND and OR matrices of FIGS. 3A and 3B;

FIG. 5 is a schematic circuit drawing of a matrix which can be substituted for the matrices shown in FIG. 3A; and FIG. 6 is a schematic block diagram of another preset counter arrangement constructed in accordance with the teachings of the present invention and incorporating beam switching or glow transfer tubes as counting units.

Figure 1:
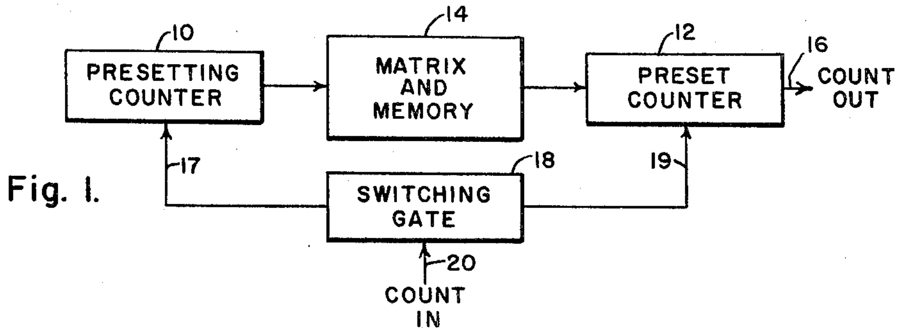
FIGURE 1 is a block diagram of the overall automatic presetting arrangement of the invention.

Referring now to the drawings, and particularly to FIG. 1, the presetting counter is indicated by the reference numeral 10; whereas the preset counter is indicated by the reference numeral 12. Interconnecting the counters 10 and 12 is a matrix and memory circuit 14 which, as will be explained hereinafter, serves to apply presetting signals from counter 10 to counter 12 whereby the counter 12 will be preset to produce an output pulse on lead 16 each time the counter 12 counts a number of pulses previously counted by the counter 10. Pulses are applied to counters 10 and 12 through a switching gate 18 having the pulses to be counted applied thereto through lead 20. The arrangement is such that the switching gate 18 is initially conditioned to feed the pulses to the presetting counter 10 only through lead 17. Thereafter, the switching gate is conditioned to feed pulses to counter 12 only through lead 19 while blocking the flow of pulses to counter 10.

Let us assume, for example, that one hundred, twenty-five pulses were fed to the presetting counter 10 before the switching gate 18 disconnected lead 20 from counter 10 and connected it to counter 12. Under these circumstances, the one hundred, twenty-five pulse count of counter 10 will be stored in matrix 14 and applied to counter 12 such that the counter 12 will produce an output pulse on lead 16 each time one hundred, twenty-five pulses are applied thereto.

Referring now to FIG. 2, a presetting arrangement for a binary counter is shown wherein elements of FIG. 1 are enclosed by broken lines and identified by like reference numerals. The switching gate 18 may comprise a pair of gate circuits 22 and 24 each having input pulses applied thereto from lead 20. The output of gate 22 is applied to a plurality of bistable binary units or multivibrators in counter 10 connected in cascade and identified as $A_1$, $A_2$, $A_3$ and $A_4$. The output of gate 24, on the other hand, is applied to a second plurality of binaries in the preset counter 12 identified as $B_1$, $B_2$, $B_3$ and $B_4$. Initially, the gate 22 will be open while gate 24 is closed; and as successive input pulses are fed to the binaries $A_1$ to $A_4$, binary ON and OFF signals will be fed to an AND matrix 26 in circuit 14 and thence through an OR matrix 28 and cathode follower circuit 30 to a coincidence amplifier 32. After the presetting counter 10 has counted a predetermined number of input pulses, signals will be applied to the gates 22 and 24 through lead 33 whereby the gate 22 will be disabled and gate 24 enabled. Thus, pulses will now be applied through gate 24 to the binaries $B_1$ to $B_4$ in the preset counter 12. As pulses are counted in the preset counter 12, binary ON and OFF signals from the binaries $B_1$ to $B_4$ are fed to the coincidence amplifier 32; and when those binary signals "match" the binary signals from OR matrix 28 in coincidence amplifier 32, an output pulse will appear on lead 16, this output pulse occurring each time the counter 12 counts the number of pulses counted by counter 10 before gate 22 was disabled. The pulses on lead 16 may, in turn, be applied to a tally counter 34 such that if the preset counter 10 counted eight pulses before gate 22 was disabled and gate 24 enabled, the count of counter 34 will be the number of pulses counted by counter 12 in groups of eight. The output pulse from coincidence amplifier 32 is also amplified through lead 36 to reset the binaries $B_1$, $B_2$, $B_3$ and $B_4$ to begin counting from zero each time a pulse is fed to the tally counter 34.

In FIG. 3A the presetting counter 10 is shown in detail. As is known, any counter is essentially a frequency divider. That is, it will produce an output pulse for every $n$th input pulse where $n$ is some predetermined number. In FIG. 3A the counter 10 comprises four bistable scale-of-two binaries $A_1$, $A_2$, $A_3$ and $A_4$ connected in cascade. The number of scale-of-two binaries, however, may be varied to suit requirements.

Each binary $A_1$, $A_2$, $A_3$ or $A_4$ is a bistable multivibrator. Binary $A_1$, for example, comprises two triodes 38 and 40 contained within a single envelope. The cathodes of triodes 38 and 40 are both connected to ground through resistor 42 and bypass capacitor 44, and their anodes are connected to a source of anode voltage, marked B+, through resistors 46 and 48, respectively. The plate of triode 38 is connected to the grid of triode 40 through resistor 50 and capacitor 52 connected in parallel. Similarly, the plate of triode 40 is connected through resistor 54 and capacitor 56 to the grid of triode 38. In this manner, only one of the two triodes can conduct at any one time. Thus, each binary is a circuit possessing two conditions of stable equilibrium. One condition is when triode 40 is conducting and triode 38 is cut off; the other when triode 38 is conducting and triode 40 is cut off. The circuit remains in one or the other of these two conditions until some action occurs which causes the non-conducting tube to conduct. The tubes then reverse their functions and remain in the new condition as long as no plate current flows in the cut-off tube. The operation of the circuit is based upon the fact that when triode 40, for example, is conducting, the low positive potential on its plate is applied through resistor 54 and capacitor 56 to the grid of triode 38, thereby preventing conduction through this tube. Conversely, when triode 38 conducts, the low positive potential on its plate will be applied through resistor 50 and capacitor 52 to the grid of triode 40, thereby cutting it off. By applying a reset pulse to terminal 58, each of the triodes 40 in the binaries $A_1$, $A_2$, $A_3$ and $A_4$ can be made to conduct while the triodes 38 are cut off.

The negative-going input pulses to be counted are applied from gate circuit 22 through capacitor 60 to the junction of resistors 46 and 48 whereby, if triode 40 is conducting and triode 38 is cut off, the stable states of these tubes will be reversed such that triode 38 will now conduct and triode 40 will be cut off. When triode 40 cuts off, a positive signal is applied through capacitor 62 to the junction of resistors 46 and 48 in binary $A_2$, but this positive signal will not cause the stable states of the triodes 38 and 40 in binary $A_2$ to change. On the next negative-going input pulse to binary $A_1$, triode 38 will again cut off while triode 40 will conduct. The resulting drop in plate voltage on triode 40 will be coupled through capacitor 62 to the junction of resistors 46 and 48 in binary $A_2$ to cut off triode 40 in binary $A_2$ and initiate conduction in triode 38. In order to switch the states of conduction of triodes 38 and 40 in binary $A_2$, it will take an additional two input pulses from the gate circuit 22, meaning that the triodes 38 and 40 in the third binary $A_3$ will not be switched until the fourth input pulse is received. In this manner, it can be seen that as successive ones of the binaries are connected in cascade in a counter arrangement, the number of pulses at the input required to produce an output on lead 64, for example, is increased by a power of two. Since there are four binaries in the counter shown in FIG. 3A, it would take sixteen input pulses to produce an output pulse on lead 64, assuming that the counter does not contain any feedback networks to change its count.

The particular counter 10 shown in FIG. 3A is a decade counter, meaning that it will count ten pulses before producing an output signal on lead 64. That is, the scale of 16 is permuted to a scale of ten by two resistor-capacitor feedback networks 66 and 68. The first feedback network 66 is connected from the plate of triode 40 in binary $A_3$ to the grid of triode 38 in binary $A_2$. In a somewhat similar manner, the second feedback network 68 is connected between the plate of triode 40 in binary $A_4$ and the grid of triode 38 in binary $A_3$. With the arrangement shown, the circuit operates as a conventional binary counter in the manner described above up to the count of four. On the count of four, the third binary $A_3$ is triggered, meaning that triode 40 in binary $A_3$ cuts off. Thus, a positive-going signal is applied through the capacitive-resistive feedback network 66 to the grid of triode 38 in binary $A_2$. At this time, the triode 38 in binary $A_2$ would normally be non-conducting, meaning that the positive pulse on the feedback network 66 applied to its grid will switch binary $A_2$. Therefore, since it requires two input pulses to trigger the second binary $A_2$, the action of the feedback network 66 is equivalent to adding two input pulses and the unit now corresponds to a binary count of six. On the count of six (which is the equivalent of eight in a binary counter without feedback) the fourth binary $A_4$ is triggered, sending a pulse through the second feedback network 68 and triggering the third binary $A_3$. This is the same result as if four additional input pulses had been applied and the unit had a binary count of twelve stored in it. The unit again operates as a binary scaler for the remaining four pulses required to reset it to zero. Therefore, by adding the equivalent of six pulses, the scale of sixteen has been permuted into a scale of ten.

Although only one decade counter is shown in FIG. 3A, it should be understood that a plurality of such counters can be connected in series such that lead 64 will be connected to the input of the next successive counter. With such an arrangement, an output pulse on lead 64 will be directed to the input of the second successive counter when the first counter resets to zero. At this point, therefore, the second counter will indicate one count. The addition of ten more input pulses from gate circuit 20 to the first counter will reset it to zero and send another pulse to the second counter. After the application of one hundred pulses to the first decade counter, the second counter will send a pulse to the next or third counter. This process will continue indefinitely as long as pulses are supplied to the cascade counting units, and it can be readily appreciated that with such an arrangement the first counter in a cascade arrangement will count units, the second counter will count tens, the third counter will count hundreds, the fourth counter will count thousands, and so on.

Referring now to FIG. 3B, the preset counter 12 is essentially the same as the presetting counter of FIG. 3A already described; and, accordingly, elements in counter 12 which correspond to those for counter 10 are identified by like, primed reference numerals. In other words, the counter 12 is also a decade counter which will count ten input pulses before producing an output pulse on lead 64'.

In order to transfer the presetting count from counter 10 to the preset counter 12 in the circuitry of FIGS. 3A and 3B, the AND matrix 26, OR matrix 28 (FIG. 3A) and coincidence amplifiers 32 (FIG. 3B) are employed. As shown in FIG. 3A, the AND matrix 26 comprises ten leads numbered 1 through 0, all connected to a source of positive voltage through resistors 70. Each of these leads is connected through four diodes to selected ones of the plates of triodes 38 and 40 in each of the binaries $A_1$ to $A_4$. Lead 1 in the AND matrix 26, for example, is connected through a first diode to lead $A_4$–38 connected to the plate of triode 38 in binary $A_4$; through a second diode to lead $A_3$–38 which is connected to triode 38 in binary $A_3$; through a third diode to lead $A_2$–38 which is connected to the plate of triode 38 in binary $A_2$; and through a fourth diode to lead $A_1$–40 which is connected to the plate of triode 40 in binary $A_1$.

Each of the triodes 38 and 40 in the binaries $A_1$ to $A_4$ comprises a bistable element which is either conducting or non-conducting. When a bistable element is conducting, its plate voltage falls, and this condition can be indicated by OFF or by "0". On the other hand, when the bistable element is cut off and its plate voltage rises, this latter condition can be indicated as ON or "1". These ON and OFF signals (i.e., 1 and 0 signals) are applied through leads $A_1$–38 to $A_4$–40 to the AND matrix 26 which monitors the plate voltages of the binaries. The code for the AND matrix shown in FIG. 4 is based upon the states of the signals on leads $A_1$–38 to $A_4$–40; however only the states of the signals on the leads connected to triodes 40 in each binary are shown, it being understood that the states of the signals on the leads connected to triodes 38 are opposite. Thus, when a single input pulse or integer is fed to the counter a signal on lead $A_1$–40 will be ON or "1" since triode 40 in binary $A_1$ is now cut off; however the triodes 40 in all other binaries will be conducting such that the signals on their plates are OFF or "0." Similarly, when four input pulses or integers are fed to the counter, the triodes 40 in binaries $A_2$ and $A_3$ will be cut off or in a "1" condition while the triodes 40 in binaries $A_1$ and $A_4$ are conducting or in a "0" condition.

If one or more of the diodes in the AND matrix on any particular lead 1–0 is conducting (i.e., a diode connected to leads $A_1$–38 to $A_4$–40 is OFF or "0"), the voltage on that lead is essentially the same as the value of the voltage on the plate of the triode in an associated binary to which that diode is connected. On the other hand, if all the diodes of a lead 1–0 are cut off, the lead is isolated and the voltage established on it is approximately equal to the power supply voltage. In the reset state, output leads 1 through 9 of the AND matrix have at least one diode connected to a "0" or OFF lead and the voltage on these leads is low or OFF. The output lead 0, however, has four diodes connected to an ON or "1" input and its voltage is, therefore, the power supply or ON (i.e., a high positive voltage).

The application of these AND matrix output signals to the OR matrix 28 starts the second step of the integer-transfer process. The presence of a power supply voltage on the 0 input lead of the OR matrix forces the four diodes connected to it into conduction and large positive voltages are developed across grid resistors 72, 74, 76 and 78 of four cathode followers 80, 82, 84 and 86 in circuit 30, respectively. That is, the 0 output lead from AND matrix 26, having a high positive voltage thereon, applies this positive voltage through leads 88, 90, 92 and 94 to the grid resistors 72–78, respectively. Since these voltages on leads 88–94 are larger in value than the voltages established on the other nine input leads 1–9 from the AND matrix 26, the other diodes connected to these leads 88–94 are back-biased and not conducting. This isolates the input leads 1 through 9 from the output leads 88–94 of the OR matrix, thereby maintaining the large positive voltages at the four grids of the cathode followers 80–86. Thus, the number zero has been transformed from four "0" or OFF values at the input of the AND matrix to four "1" or ON values at the output of the OR matrix 28 as shown in FIG. 4 and the integer-transfer process is complete.

This zero code is then directed via leads 96, 98, 100 and 102 to the cathodes of four coincidence amplifiers 104, 106, 108 and 110, respectively, in circuit 32 shown in FIG. 3B. The grids of the coincidence amplifiers 104 to 110 are connected through leads 105, 107, 109 and 111, respectively, to the plates of triodes 38' in each of the binaries $B_1$, $B_2$, $B_3$ and $B_4$ of the preset counter 12 shown in FIG. 3B. Thus, any one of the coincidence amplifiers 104 to 110 will produce an output signal across load resistor 112 when, and only when, there is coincidence of input signals on the grid and cathode of one or more of the amplifiers 104 to 110. These signals or pulses are, in turn, counted by the tally counter 34 and used to reset binaries $B_1$–$B_4$ through lead 113 connected to the grids of triodes 40' in each binary.

The remaining integers or pulse inputs are transferred in a similar manner, but with different codes. If, for example, one pulse enters the presetting decade counter 10 of FIG. 3A, binary $A_1$ of that counter switches states and one count is tallied. The signal on lead $A_1$–40 to the AND matrix 26 is now "1" or ON and all of the diodes on lead 1 at the output of the AND matrix 26 are cut off. Consequently, a high positive voltage is applied to leads 90, 92 and 94 of the OR matrix 28 which back-biases the other diodes connected to these leads. Thus, a high "1" or ON voltage appears on leads 90, 92 and 94; whereas a low or "0" voltage appears on lead 88. This condition is shown, for example, in the OR matrix code of FIG. 4. With positive voltages on leads 90, 92 and 94, the cathode followers 82, 84 and 86 conduct to produce positive signals on leads 98, 100 and 102. The cathode follower 80, however, does not conduct so that a low positive signal is produced on lead 96, this lead being connected as shown in FIG. 3B to the cathode of coincidence amplifier 104.

When the count of the presetting counter 10 is one, as gate 22 is disabled for example, the lead 96 has a low positive potential while leads 98 to 102 are highly positive. Consequently, coincidence amplifier 104 is permitted to be turned ON and OFF and the remaining coincidence amplifiers 106 to 110 are cut off at all times. With no pulses being applied to the preset counter 12, the voltage on the plate of triode 38' of binary $B_1$ is high since this triode is now cut off. This large positive voltage is applied to the grid of coincidence amplifier 104 and causes the tube to conduct. Insertion of one pulse into the preset counter 12 requires that binary $B_1$ switch states. At this time, the voltage on the plate of triode 38' in binary $B_1$ drops, the coincidence amplifier 104 is cut off, and a positive transient is developed across the resistor 112. This positive transient appears as a pulse and is counted in the tally counter 34. It also serves to reset the counter 12 whereby triode 40' in binary $B_1$ will again conduct. Consequently, on the next successive input pulse, another positive transient will be produced and will be counted by the tally counted 34. Thus, one pulse will be fed to tally counter 34 for every single input pulse to the preset counter 12 for the reason that it has been preset by counter 10 to count one pulse.

Let us assume, now, that the counter 10 has counted five pulses prior to the time that gate 22 was disabled. With reference to the AND matrix of FIG. 4, it will be noted that leads $A_1$–40, $A_2$–40 and $A_3$–40 have ON or "1" signals thereon; whereas lead $A_4$–40 has an OFF or "0" signal thereon. Under these conditions, only lead 5 at the output of the AND matrix 26 will have a high positive voltage thereon, thereby transferring this high positive voltage to leads 90 and 94 as shown in the OR matrix code of FIG. 4. When leads 90 and 94 are thus biased positively, cathode followers 82 and 86 will conduct to produce positive signals on leads 98 and 102. The leads 96 and 100, however, will be biased such that only the coincidence amplifiers 106 and 110 can conduct when the plate of triode 38' in binary $B_2$ and the plate of triode 38' in binary $B_4$ are positive. This occurs when, and only when, five input pulses are applied to the preset counter 12. Accordingly, a positive transient will appear across load resistor 112 each time five input pulses are applied to the preset counter 12. Of course, since the cathode of amplifier 106 is biased negative for a preset count of five, it will cut off by itself one or more times before the count of five is reached. This, however, will not produce the positive transient required to trigger tally counter 34 since tube 110 will still be conducting. The positive transient will be produced when, and only when, all conducting tubes are cut off simultaneously.

Referring now to FIG. 5, another type of integer-transfer matrix is shown which is simpler in construction than the matrix arrangement of FIGS. 3A and 3B. In this case, the leads $A_1$–38 and $A_2$–38 are not employed; however the signals appearing on leads 88–94 will correspond to the OR matrix code shown in FIG. 4. For example, when one input pulse is fed to the counter, the lead $A_1$–40 will be ON or in a "1" condition. Consequently, the diode connected to output lead 88 will be biased to cut off, and a high positive voltage will appear on this lead 88, but not the leads 90–94, this condition being the one required for a preset count of one in counter 12 as described above.

As will be understood, when two or more preset decade counters are connected in cascade, their outputs from coincidence amplifiers 32 must be passed through a like number of coincidence stages, not shown herein. Assume, for example, that the preset counter comprises a units, tens and hundreds decade in cascade and that the preset count is one hundred, twenty-five. Under these circumstances, the three coincidence stages will produce an output when, and only when, the units, tens and hundreds decades simultaneously reach counts of five, two and one, respectively.

Referring now to FIG. 6, another type of counting arrangement is shown wherein the presetting and preset counters comprise a pair of beam switching tubes X and Y of the type manufactured, for example, by the Burroughs Corporation and sold under the trademark Beam-X. Alternatively, the units X and Y could comprise glow transfer tubes of the type manufactured by Baird-Atomic, Incorporated, Cambridge, Massachusetts, and sold under the trademark Dekatron. Each of these tubes has an input for pulses to be counted and a plurality of output terminals or leads, only one of which is ON while all others are OFF. In the embodiment of the invention shown in FIG. 6, there are ten output terminals for unit X identified as X1 to X0. Similarly, there are ten output terminals for unit Y identified as Y1 to Y0. The corresponding output terminals for units X and Y are connected to ten AND circuits 1A to 0A, and the outputs of these AND circuits are applied to a common output lead 120.

It is a characteristic of the beam switching or glow transfer tube that as input pulses are applied thereto from gate 22 or gate 24, for example, the ON output lead will switch from X1 to X2 to X3 to X4, etc. or Y1 to Y2 to Y3 to Y4, etc. As was mentioned above, when any one of the output terminals is ON, all other output terminals are OFF. Furthermore, the AND circuits 1A to 0A will produce an output on lead 120 when, and only when, there is coincidence of ON signals on the output leads from units X and Y connected thereto.

In the operation of the device of FIG. 6 the pulses from lead 20 are initially applied through gate 22 to unit X. Let us assume, for example, that nine pulses are counted by unit X before the gate 22 is disabled and gate 24 enabled. Under these circumstances, the output lead X9 will be in an ON condition while all other output leads from this unit are OFF. Consequently, when gate 24 is enabled and unit Y begins to count pulses, it will count up to nine, and whereupon the lead Y9 is in an ON condition such that the AND circuit 9A will produce an output pulse on lead 20 and reset unit Y through lead 122 to again begin counting from zero. Thus, an output will appear on lead 120 each time the preset unit Y counts nine pulses.

Although the invention has been shown in connection with certain specific embodiments, it will be readily apparent to those skilled in the art that various changes in form and arrangement of parts may be made to suit requirements without departing from the spirit and scope of the invention. In this respect, other types of counting arrangements are possible wherein the presetting and preset counters can comprise any or all combinations of the types described. For example, beam switching or glow transfer presetting of binary counters, and the converse, would be in accordance with the teachings of this invention.

We claim as our invention:

1. Pulse counting apparatus comprising a first counter, means for feeding input pulses to said first counter, a second counter, means for selectively stopping the feed of input pulses to said first counter and for starting the feed of input pulses to the second counter, and means electrically connected to said first and second counters for presetting the second counter to count the number of pulses counted by the first counter prior to stoppage of the feed of input pulses thereto.

2. Pulse counting apparatus comprising a first counter, first gate means for feeding input pulses to said first counter, a second counter, second gate means for feeding input pulses to said second counter, means for initially enabling said first gate circuit to feed input pulses to said first counter while disabling said second gate circuit, means for thereafter disabling the first gate circuit while enabling the second gate circuit to feed input pulses to said second counter, and means for presetting said second counter to count the number of pulses counted by the first counter prior to stoppage of input pulses thereto.

3. Pulse counting apparatus including a first counter comprising a pluarility of bistable elements each of which may be either ON or OFF, means for feeding input pulses to said first counter, a second counter also comprising a plurality of bistable elements each of which may be ON or OFF, means for selectively stopping the feed of input pulses to said first counter and for starting the feed of input pulses to the second counter, and means for presetting said second counter to count the number of pulses counted by the first counter prior to stoppage of the feed of input pulses thereto.

4. Pulse counting apparatus including a first counter comprising a plurality of bistable elements each of which may be either ON or OFF, first gate means for feeding input pulses to said first counter, a second counter also comprising a plurality of bistable elements each of which may be either ON or OFF, second gate means for feeding input pulses to said second counter, means for initially enabling said first gate means to feed input pulses to the first counter while disabling said second gate means, means for thereafter disabling the first gate means while enabling the second gate means to feed input pulses to said second counter, and means connected to each of the bistable elements in said first counter for presetting the second counter to count the number of pulses counted by the first counter prior to the time that said first gate means is disabled.

5. Pulse counting apparatus including a first counter comprising a plurality of bistable elements each of which may be either ON or OFF, first gate means for applying input pulses to said first counter, a second counter also comprising a plurality of bistable elements each of which may be either ON or OFF, second gate means for applying input pulses to said second counter, means for initially enabling said first gate means to feed input pulses to the first counter while disabling the second gate means, means for thereafter disabling the first gate means while enabling the second gate means to feed input pulses to said second counter, and means including an AND circuit connected to at least some of the bistable elements in said first counter for presetting said second counter to count the number of pulses counted by the first counter prior to the time that said first gate means is disabled.

6. Pulse counting apparatus including a first counter comprising a plurality of bistable elements each of which may be either ON or OFF, means for feeding input pulses to said first counter, a second counter also comprising a plurality of bistable elements each of which may be either ON or OFF, means for selectively stopping the feed of impulses to said first counter and for starting the feed of input pulses to the second counter, and means for presetting said second counter to count the number of pulses counted by the first counter prior to stoppage of the feed of input pulses thereto, said latter-mentioned means including an AND circuit serially connected with an OR circuit.

7. Pulse counting apparatus including a first counter comprising a plurality of bistable elements, each of which may be either ON or OFF, means for feeding input pulses to said first counter, a second counter also comprising a plurality of bistable elements each of which may be either ON or OFF, means for selectively stopping the feed of input pulses to said first counter and for starting the feed of input pulses to the second counter, means for presetting said second counter to count the number of pulses counted by the first counter prior to stoppage of the feed of input pulses thereto, said latter-mentioned means comprising an AND matrix connected to at least some of the bistable elements in said first counter, an OR matrix connected to the output of said AND matrix, and a coincidence stage operable in response to the coincidence of an ON signal from said OR matrix with an ON signal from certain ones of the bistable elements in said second counter for producing an output pulse from the second counter when it has counted the number of pulses counted by the first counter prior to stoppage of the feed of input pulses thereto.

8. Pulse counting apparatus including a first counter comprising a plurality of bistable elements each of which may be either ON or OFF, means for feeding input pulses to said first counter, a second counter also comprising a plurality of bistable elements each of which may be either ON or OFF, means for selectively stopping the feed of input pulses to said first counter and for starting the feed of input pulses to the second counter, means for presetting said second counter to count the number of pulses counted by the first counter prior to stoppage of the feed of input pulses thereto, said latter-mentioned means comprising an AND matrix including a plurality of diodes which are either conducting or non-conducting depending upon which of the bistable elements in said first counter are ON, an OR matrix connected to the output of said AND matrix and including a plurality of diodes which are either conducting or non-conducting depending upon the states of conduction of the diodes in said AND matrix, and a coincidence stage responsive to coincidence of a signal from the OR matrix with a signal from a bistable element in the second counter for producing an output pulse each time the number of pulses counted by the second counter is equal to the number of pulses counted by the first counter prior to stoppage of the feed of input pulses thereto.

9. Pulse counting apparatus including a first decade counter comprising eight bistable elements each of which may be either ON or OFF, means for feeding input pulses to said first counter, a second decade counter also comprising eight bistable elements each of which may be either ON or OFF, means for selectively stopping the feed of input pulses to said first counter and for starting the feed of input pulses to said second counter, means for presetting said second counter to count the number of pulses connected by the first counter prior to stoppage of the feed of input pulses thereto, said latter-mentioned means comprising an AND matrix having eight input leads connected to the respective eight bistable elements of said first counter and ten output leads, unidirectional current devices connecting the input leads to certain ones of the output leads, an OR matrix including unidirectional current devices connecting the ten output leads from said AND matrix to certain ones of four output leads from the OR matrix, four coincidence circuits having their outputs connected in parallel, means connecting each of the output leads from said OR matrix to an associated one of said coincidence circuits, and means connecting four of the bistable elements in said second counter to an associated one of the coincidence circuits, the arrangement being such that an output pulse will be produced at the parallel output of said coincidence circuits upon coincidence of a signal on one of the output leads from said OR matrix with an output signal from one of said four bistable elements in the second counter.

10. Pulse counting apparatus including a first counter comprising a plurality of bistable elements each of which may be either ON or OFF, means for feeding input pulses to said first counter, a second counter also comprising a plurality of bistable elements each of which may be either ON or OFF, means for selectively stopping the feed of input pulses to said first counter and for starting the feed of input pulses to the second counter, means for presetting said second counter to count the number of pulses counted by the first counter prior to stoppage of the feed of input pulses thereto, said last-mentioned means comprising a coincidence stage, logic circuitry connecting at least some of the bistable elements in said first counter to said coincidence stage, and means connecting at least some of the bistable elements in said second counter to said coincidence stage.

11. The pulse counting apparatus of claim 10 wherein said first counter comprises a plurality of bistable flip-flop circuits connected in cascade, each of said bistable circuits including two bistable elements therein.

12. The pulse counting apparatus of claim 10 wherein said second counter comprises a plurality of bistable flip-flop circuits connected in cascade, each of the flip-flop circuits including two bistable elements therein.

13. Pulse counting apparatus including first and second beam switching devices, each of said devices having an input terminal for pulses to be counted and a plurality of output terminals only one of which is in an ON bistable signal state while the others are in an OFF bistable signal state, the one of said output terminals which is ON being a function of the number of input pulses applied to the beam switching device, means for initially feeding input pulses to the first of said devices means for thereafter stopping the feed of input pulses to said first device and for starting the feed of input pulses to the second device, and a plurality of AND circuits each of which is connected to an output terminal of said first device and a corresponding output terminal of the other device and adapted to produce an output signal upon coincidence of pulses from the output terminals to which it is connected, the arrangement being such that only one of said AND devices will produce an output each time the pulses counted by the second device are equal to those counted by the first device prior to the stoppage of input pulses thereto.

14. Pulse counting apparatus including first and second glow transfer tubes, each of said tubes having an input terminal for pulses to be counted and a plurality of output terminals only one of which is in an ON bistable signal state while the others are in an OFF bistable signal state, the one of said output terminals which is ON being a function of the number of input pulses applied to the glow transfer tube, means for initially feeding input pulses to the first of said tubes, means for thereafter stopping the feed of input pulses to said first tube and for starting the feed of input pulses to the second tube, and a plurality of AND circuits each of which is connected to an output terminal of said first tube and a corresponding output terminal of the other tube and adapted to produce an output signal upon coincidence of pulses from the output terminals to which it is connected, the arrangement being such that only one of said AND devices will produce an output each time the pulses counted by the second tube are equal to those counted by the first tube prior to the stoppage of input pulses thereto.

15. Pulse counting apparatus including first and second beam switching devices, each of said devices having an input terminal for pulses to be counted and a plurality of output terminals which are successively changed from any OFF bistable signal state to an ON bistable signal state, only one of said output terminals being in an ON bistable signal state at any time and the output terminal which is ON being a function of the number of input pulses applied to the device, means for initially feeding input pulses to the first of said devices, means for thereafter stopping the feed of input pulses to said first device and for starting the feed of input pulses to the second device, and a plurality of AND circuits each of which is connected to an output terminal of said first device and the corresponding successive output terminal of the other device and adapted to produce an output signal upon coincidence of pulses from the output terminals to which it is connected, the arrangement being such that only one of said AND circuits will produce an output each time the pulses counted by the second device are equal to those counted by the first device prior to the stoppage of input pulses thereto.

16. Pulse counting apparatus including first and second glow transfer devices, each of said devices having an input terminal for pulses to be counted and a plurality of output terminals which are successively changed from an OFF bistable signal state to an ON bistable signal state, only one of said output terminals being in an ON bistable signal state at any time and the output terminal which is ON being a function of the number of input pulses applied to the device, means for initially feeding input pulses to the first of said devices, means for thereafter stopping the feed of input pulses to said first device and for starting the feed of input pulses to the second device, and a plurality of AND circuits each of which is connected to an output terminal of said first device and the corresponding successive output terminal of the other device and adapted to produce an output signal upon coincidence of pulses from the output terminals to which it is connected, the arrangement being such that only one of said AND circuits will produce an output each time the pulses counted by the second device are equal to those counted by the first device prior to the stoppage of input pulses thereto.

References Cited by the Examiner

UNITED STATES PATENTS

| | | | |
|---|---|---|---|
| 2,774,534 | 12/1956 | Dunn | 235—92 |
| 2,811,713 | 10/1957 | Spencer | 340—347 |
| 3,126,475 | 3/1964 | Coddington et al. | 235—160 |
| 3,143,645 | 8/1964 | Armstrong | 235—177 |

MAYNARD R. WILBUR, *Primary Examiner.*

MALCOLM A. MORRISON, *Examiner.*

J. F. MILLER, *Assistant Examiner.*